(12) United States Patent
Katsuki et al.

(10) Patent No.: US 7,079,120 B2
(45) Date of Patent: Jul. 18, 2006

(54) TOUCH PANEL DEVICE

(75) Inventors: Takashi Katsuki, Kawasaki (JP);
Fumihiko Nakazawa, Kawasaki (JP);
Satoshi Sano, Kawasaki (JP); Yuji Takahashi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 369 days.

(21) Appl. No.: 10/446,153

(22) Filed: May 28, 2003

(65) Prior Publication Data
US 2004/0027342 A1    Feb. 12, 2004

(30) Foreign Application Priority Data
May 29, 2002   (JP) .............................. 2002-156038

(51) Int. Cl.
*G09G 5/00* (2006.01)
(52) U.S. Cl. .................. 345/177; 345/173; 310/313 R; 178/18.04
(58) Field of Classification Search ........ 345/173–183; 178/18.01, 18.04, 19.02; 310/311, 313 R, 310/313 D, 313 A, 313 B
See application file for complete search history.

(56) References Cited

U.S. PATENT DOCUMENTS

| | | | | |
|---|---|---|---|---|
| RE33,151 E | * | 1/1990 | Adler | .......................... 345/177 |
| 5,986,224 A | * | 11/1999 | Kent | ......................... 178/18.04 |
| 5,994,817 A | * | 11/1999 | Toda | ........................ 310/313 R |
| 6,023,122 A | * | 2/2000 | Liu et al. | ................. 310/313 B |
| 6,078,315 A | * | 6/2000 | Huang | ......................... 345/177 |
| 6,091,406 A | * | 7/2000 | Kambara et al. | ............ 345/177 |
| 6,426,583 B1 | * | 7/2002 | Onishi et al. | ............ 310/313 R |
| 6,750,853 B1 | * | 6/2004 | Takahashi et al. | ........... 345/177 |
| 6,756,973 B1 | * | 6/2004 | Sano et al. | ................. 345/177 |
| 2003/0011577 A1 | * | 1/2003 | Katsuki et al. | .............. 345/173 |
| 2003/0038789 A1 | * | 2/2003 | Nakazawa et al. | ........... 345/173 |
| 2003/0234773 A1 | * | 12/2003 | Sano et al. | ................. 345/177 |
| 2004/0027342 A1 | * | 2/2004 | Katsuki et al. | .............. 345/177 |
| 2004/0104827 A1 | * | 6/2004 | Katsuki et al. | ................ 341/34 |
| 2005/0073505 A1 | * | 4/2005 | Katsuki et al. | .............. 345/173 |

* cited by examiner

*Primary Examiner*—Lun-Yi Lao
(74) *Attorney, Agent, or Firm*—Westerman, Hattori, Daniels & Adrian, LLP.

(57) ABSTRACT

Each of excitation elements and receiving elements placed in a frame region of a non-piezoelectric substrate is constructed by forming a comb-like electrode on the front face of a piezoelectric body and forming a plate electrode (solid electrode) on the rear face thereof. The comb-like electrode is composed of a bus electrode and a plurality of V-shaped electrode fingers extended from the bus electrode. Drawn-round wires are provided to connect the comb-like electrode (bus electrode) and plate electrode to external circuits. Surface acoustic waves from the excitation elements located on the upper side and the lower side are simultaneously propagated in two directions respectively and the propagated surface acoustic waves are received by receiving elements located on the left side and the right side respectively.

20 Claims, 10 Drawing Sheets

TOUCH PANEL DEVICE

BACKGROUND OF THE INVENTION

The present invention relates to a touch panel device for detecting the contact of an object such as a finger or a pen with the touch panel device, and more particularly relates to a touch panel device for detecting the contact position of the object by detecting attenuation and cutoff of surface acoustic waves (SAWs) by using excitation elements and receiving elements, each constructed by forming electrodes on a piezoelectric body.

With the spread of computer systems, mainly personal computers, there has been used a device for inputting new information or giving various instructions to a computer system by pointing at a position on a display screen of a display device on which information is displayed by the computer system, with an object such as a finger or a pen. In order to perform an input operation with respect to the information displayed on the display screen of the display device of a personal computer or the like by a touching method, it is necessary to detect the contact position (pointed position) on the display screen with high accuracy.

Well known examples of a touch panel device for detecting the contact position of an object such as a finger and a pen are a device using a resistance film, and a device using ultrasonic waves. The former device using a resistance film detects a change in the resistance of the resistance film caused by contact of the object with the resistance film. This device has the advantage of low consumption of power, but has problems in the aspects of the response time, detection performance and durability.

By contrast, in the device using ultrasonic waves, the contact position of the object is detected by propagating surface acoustic waves on a non-piezoelectric substrate, for example, and detecting attenuation of the surface acoustic waves caused by contact of the object such as a finger and a pen with the non-piezoelectric substrate. There has been developed a touch panel device that uses, as transducers for exciting and receiving surface acoustic waves, comb-like electrodes (IDTs: inter digital transducers) that can be produced collectively using a photolithography technique. In this touch panel device, as each of excitation elements for exciting surface acoustic waves and receiving elements for receiving propagated surface acoustic waves, an element constructed by forming a comb-like electrode on a piezoelectric body in the form of a thin film is used.

FIG. 1 is an illustration showing the configuration of such a conventional touch panel device using comb-like electrodes. In FIG. 1, the numeral 61 represents a rectangular non-piezoelectric substrate. A plurality of excitation elements 62, each constructed by forming a comb-like electrode on a piezoelectric body, for exciting surface acoustic waves are arranged in a line on one end of each of the X-direction and Y-direction of the non-piezoelectric substrate 61. Moreover, a plurality of receiving elements 63, each constructed by forming a comb-like electrode on a piezoelectric thin film, for receiving surface acoustic waves are arranged in a line on the other end of each of the X-direction and Y-direction of the non-piezoelectric substrate 61.

In this touch panel device, periodic signals are inputted to the excitation elements 62 to excite surface acoustic waves and propagate them on the non-piezoelectric substrate 61, and then the propagated surface acoustic waves are received by the receiving elements 63. Then, when an object such as a finger and a pen comes into contact with the propagation path of the surface acoustic waves on the non-piezoelectric substrate 61, the surface acoustic waves attenuate. Accordingly, it is possible to detect the presence or absence of contact of the object and the contact position by detecting whether or not the level of the received signals at the receiving elements 63 is attenuated.

In the touch panel device with such a structure, since the resolution performance is determined by the aperture length of the comb-like electrode, a small aperture length is preferable. However, there is a correlation between the aperture length and the wavelength of the surface acoustic wave, and, when the aperture is narrowed, the diffraction effect is increased abruptly and it becomes difficult to distinguish a path on which the surface acoustic wave is propagated. Hence, in order to improve the resolution performance for the detection position, the present inventor et al. have proposed a touch panel device in which the excitation elements and receiving elements are disposed so as to propagate surface acoustic waves in oblique directions (diagonal directions) of the non-piezoelectric substrate.

FIG. 2 is an illustration showing the configuration of an example of such a touch panel device (hereinafter referred to as the conventional example). In FIG. 2, the numeral 71 represents a rectangular non-piezoelectric substrate, and a center portion enclosed by an alternate long and short dashed line is a detection region 71a capable of detecting the contact position.

In a frame region 71b outside the detection region 71a, which is a peripheral section of the non-piezoelectric substrate 71, excitation elements 72 are disposed on the upper side and lower side of the substrate 71, while receiving elements 73 are positioned on the left side and right side thereof. FIG. 3 is a partial cross sectional view of the excitation element 72 or the receiving element 73, and the excitation element 72 or the receiving element 73 is constructed by forming a comb-like electrode 75 on a piezoelectric body 74 in the form of a thin film. This comb-like electrode 75 comprises facing bus electrodes 77 and a plurality of electrode fingers 78 which are extended from the bus electrodes 77 by turns and bent in the middle. In this structure, lines of a plurality of electrode fingers 78 tilted in two directions from the facing direction of the bus electrodes 77 are formed, thereby realizing simultaneous excitation of surface acoustic waves in two directions and simultaneous reception of surface acoustic waves from two directions. Furthermore, in the frame region 71b, there are provided drawn-round wires 79 for connecting the bus electrodes 77 to external circuits (such as an oscillation circuit and a receiving level detecting circuit).

In such a structure, surface acoustic waves are excited in two directions by the excitation elements 72, and the excited surface acoustic waves are propagated in two diagonal directions of the non-piezoelectric substrate 71 and then received by the receiving elements 73. Based on the received results, the presence or absence of contact of an object and the contact position are detected in the same manner as in the conventional example shown in FIG. 1.

In the touch panel device, since the frame region outside the detection region, in which the excitation elements, receiving elements, drawn-round wires, etc. are placed, is a region where the contact position of an object is not detectable, it is necessary to narrow the area of this frame region. Since the above-described conventional example has a pattern of electrode fingers with different polarities which are alternately present (see FIG. 3), it is necessary to provide a bus electrode for each polarity. Accordingly, each side needs to have a width for two lines of bus electrodes in addition to the width of the excitation/receiving region (region for forming the electrode fingers), and consequently there is the problem of an increase in the area of the frame region.

Furthermore, in each of the boundary areas (four corners) between a side where the excitation element is placed and a side where the receiving element is placed, a width for the bus electrodes is also necessary. Therefore, a region (a section near the diagonal line shown by hatching in FIG. 2) where the surface acoustic waves propagated in the diagonal direction are weak becomes wider, and the touch panel device may suffer from the problem of a decrease in the detection accuracy.

BRIEF SUMMARY OF THE INVENTION

The present invention has been made with the aim of solving the above problems, and it is an object of the present invention to provide a touch panel device capable of narrowing a frame region and improving the degree of freedom in the design of electrodes, drawn-round wires, etc.

Another object of the present invention is to provide a touch panel device capable of improving the resolution performance for the detection of a contact position.

Still another object of the present invention is to provide a touch panel device capable of reducing the resistance of the drawn-round wires.

A touch panel device according to the first aspect is a touch panel device that comprises excitation elements for exciting surface acoustic waves and receiving elements for receiving surface acoustic waves at a peripheral section of a rectangular substrate, propagates surface acoustic waves between the excitation elements and the receiving elements on the substrate, and detects a position of an object in contact with the substrate based on received results at the receiving elements, wherein each of the excitation elements and the receiving elements comprises a film-like piezoelectric body, a comb-like electrode formed on one surface of the piezoelectric body, and a plate electrode formed on the other surface of the piezoelectric body.

In the touch panel device of the first aspect, each of the excitation elements and the receiving elements is constructed by forming the comb-like electrode including a plurality of extended electrode fingers of the same polarity on the one surface of the piezoelectric boy, instead of a comb-like electrode including electrode fingers of different polarities placed by turns, and forming the plate electrode having a polarity different from the comb-like electrode on the other surface of the piezoelectric body. Thus, in the present invention, only a width of one line of bus electrode is necessary, and the frame region can be narrowed compared with the conventional example in which a width of two lines of bus electrodes is necessary for each side because electrodes with different polarities are present on the same plane. Moreover, since there is no need to dispose electrodes having different polarities on the same plane, it is possible to improve the degree of freedom in design.

A touch panel device according to the second aspect is based on the first aspect, wherein the excitation element and receiving element that form a pair are disposed at peripheral sections in a diagonal direction of the substrate so as to propagate surface acoustic waves in the diagonal direction on the substrate.

In the touch panel device of the second aspect, the excitation element and receiving element that form a pair are disposed at peripheral sections in a diagonal direction of the substrate, and surface acoustic waves are propagated in the diagonal direction of the substrate. Therefore, the resolution performance for the detection of a contact position is increased compared to a structure in which surface acoustic waves are propagated in a side direction.

A touch panel device according to the third aspect is based on the second aspect, wherein the comb-like electrode has electrode fingers bent in the middle thereof, the excitation element excites surface acoustic waves in two directions simultaneously, and the receiving element receives surface acoustic waves from two directions simultaneously.

In the touch panel device of the third aspect, surface acoustic waves in two directions are excited by one excitation element, and surface acoustic waves in two directions are received by one receiving element. It is therefore possible to efficiently excite surface acoustic waves and receive surface acoustic waves.

A touch panel device according to the fourth aspect is based on any one of the first through third aspects, and further comprises a wire connected to the comb-like electrode or the plate electrode, wherein a conductive material is superimposed on the wire.

In the touch panel device of the fourth aspect, the conductive material such as a silver paste, for example, is superimposed on a drawn-round wire. Consequently, the thickness of the drawn-round wire is increased, and the resistance thereof is decreased.

A touch panel device according to the fifth aspect is based on any one of the first through third aspects, and further comprises: a first wire connected to the comb-like electrode; and a second wire connected to the plate electrode, wherein the first wire is placed on the one surface of the piezoelectric body, and the second wire is placed on the other surface of the piezoelectric body.

In the touch panel device of the fifth aspect, the first drawn-round wire from the comb-like electrode is placed on the one surface of the piezoelectric body, and the second drawn-round wire from the plate electrode is placed on the other surface of the piezoelectric body. It is therefore possible to narrow the frame region compared with a structure in which all the drawn-round wires are placed on one surface of the piezoelectric body. Moreover, the degree of freedom in the design of the drawn-round wires is also improved.

A touch panel device according to the sixth aspect is based on any one of the first through fifth aspects, wherein the plate electrodes of the excitation elements and the plate electrodes of the receiving elements are formed as a single electrode.

In the touch panel device of the sixth aspect, the plate electrode is common to all excitation elements and receiving elements. It is therefore possible to further narrow the frame region.

A touch panel device according to the seventh aspect is based on any one of the second through fifth aspects, wherein the excitation element and/or the receiving element is extended over a corner section of the substrate to the edge of adjacent side.

In the touch panel device of the seventh aspect, a surface acoustic wave excitation region and/or receiving region is formed over the corner section of the substrate to the edge of adjacent side. It is therefore possible to prevent the surface acoustic waves from becoming weaker near the diagonal line.

A touch panel device according to the eighth aspect is a touch panel device that comprises excitation elements for exciting surface acoustic waves and receiving elements for receiving surface acoustic waves at a peripheral section of a rectangular substrate, propagates surface acoustic waves between the excitation elements and the receiving elements on the substrate, and detects a position of an object in contact with the substrate based on received results at the receiving elements, wherein each of the excitation elements and the receiving elements comprises a film-like piezoelectric body, a grid-like electrode formed on one surface of the piezoelectric body, and a plate electrode formed on the other surface of the piezoelectric body.

In the touch panel device of the eighth aspect, each of the excitation elements and receiving elements is constructed by forming the grid-like electrode having one polarity on the one surface of the piezoelectric body and forming the plate electrode having other polarity on the other surface of the piezoelectric body. Therefore, like the first aspect, only a width of one line of bus electrode is necessary, and the frame region can be narrowed compared with the conventional example. Moreover, since there is no need to dispose electrodes having different polarities on the same plane, it is possible to improve the degree of freedom in design. Furthermore, since this touch panel uses the grid-like electrode, it is possible to increase the aperture width and improve the detection accuracy compared with the structure using the comb-like electrode.

The above and further objects and features of the invention will more fully be apparent from the following detailed description with accompanying drawings.

DETAILED DESCRIPTION OF THE INVENTION

The following description will explain the present invention in detail with reference to drawings illustrating some embodiments thereof.

FIRST EMBODIMENT

Figure 4:
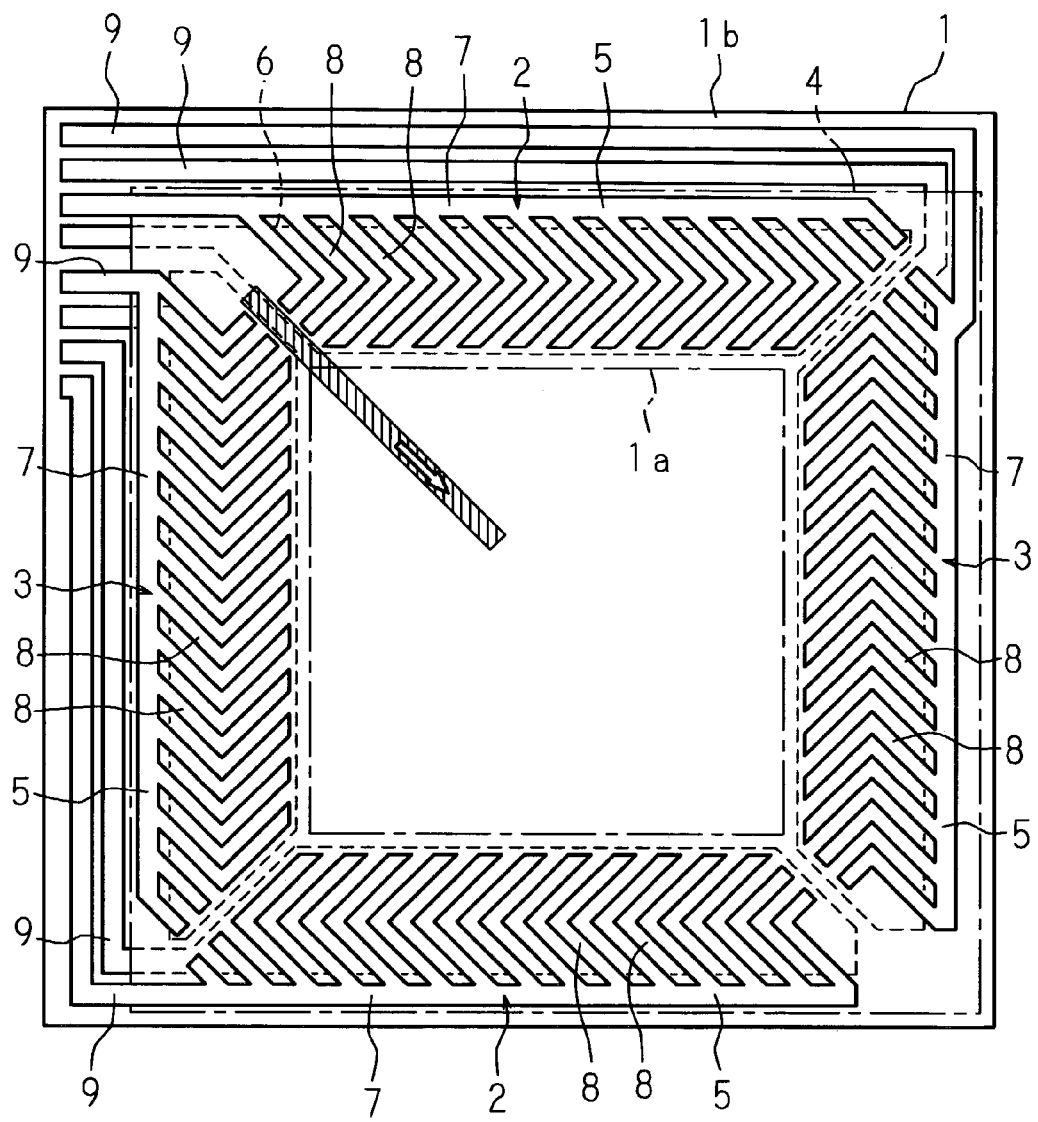
FIG. 4 is an illustration showing the configuration of a touch panel device according to the first embodiment.

FIG. 4 is an illustration showing the configuration of a touch panel device according to the first embodiment of the present invention. In FIG. 4, the numeral 1 represents a rectangular non-piezoelectric substrate which is made, for example, of a glass material and capable of propagating a surface acoustic wave, and a center portion enclosed by an alternate long and short dash line is a detection region 1a capable of detecting a contact position.

In a frame region 1b outside the detection region 1a, which is a peripheral section of the non-piezoelectric substrate 1, excitation elements 2 for simultaneously exciting surface acoustic waves in two directions are placed on the upper side and lower side of the frame region 1b, and receiving elements 3 for simultaneously receiving surface acoustic waves from two directions are placed on the left side and the right side thereof.

Figure 5:
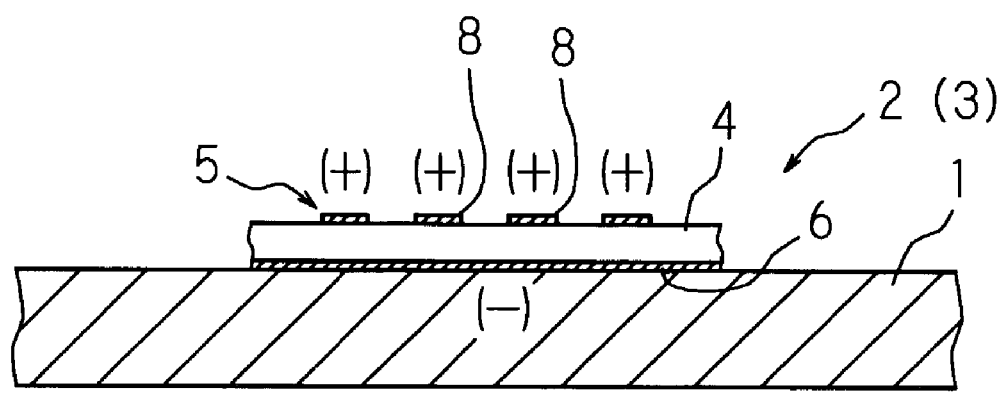
FIG. 5 is a partial cross sectional view of an excitation element or receiving element of the present invention.

These excitation elements 2 and receiving elements 3 have the same structure. FIG. 5 is a partial cross sectional view of the excitation element 2 or receiving element 3. The excitation element 2 or receiving element 3 is constructed by forming a comb-like electrode 5 on one surface (the front face) of a piezoelectric body 4 in the form of a thin film made of AlN or ZnO, for example, and forming a plate electrode (solid electrode) 6 on the other surface (the rear face) thereof. As shown in FIG. 4, the comb-like electrode 5 on the front face comprises one line of bus electrode 7, and a plurality of electrode fingers 8 which are extended from the bus electrode 7 and bent in the middle into V shape. Note that, in FIG. 4, the plate electrode 6 is shown by the broken line, and the installation range of the piezoelectric body 4 is indicated by the alternate long and short dash line.

These comb-like electrode 5 and plate electrode 6 are connected to external circuits (an oscillation circuit, received level detection circuit, etc.), and a flexible cable is often used for the connection. Accordingly, as shown in FIG. 4, drawn-round wires 9 from each comb-like electrode 5 (bus electrode 7) and each plate electrode 6 are placed in the frame region 1b so as to connect them to a flexible cable at one position of the touch panel device.

In such a structure, by applying periodical signals between the comb-like electrode 5 and the plate electrode 6, surface acoustic waves are simultaneously excited in two directions by the excitation elements 2, and the excited surface acoustic waves are propagated in two diagonal directions of the non-piezoelectric substrate 1 and received by the receiving elements 3. More specifically, the surface acoustic waves from the upper-side excitation element 2 are propagated in a lower left oblique direction and a lower right oblique direction and then received by the left-side and right-side receiving elements 3, while the surface acoustic waves from the lower-side excitation element 2 are propagated in an upper left oblique direction and an upper right oblique direction and then received by the left-side and right-side receiving elements 3.

Here, when an object such as a finger and a pen comes into contact with the propagation path of surface acoustic waves on the non-piezoelectric substrate 1, the surface acoustic waves attenuate. Therefore, by detecting the presence or absence of attenuation in the level of the received signals at the two receiving elements 3, it is possible to detect the presence or absence of contact of the object and the contact position.

In the present invention, each of the excitation elements 2 and the receiving elements 3 is constructed by forming the comb-like electrode 5 including a plurality of extended electrode fingers 8 of the same polarity on the front face of the piezoelectric body 4 and forming the plate electrode 6 having a polarity different from the electrode fingers 8 on the rear face of the piezoelectric body 4 (see FIG. 5). Thus, in the present invention, only a width of one line of bus electrode 7 is necessary, and the frame region 1b can be narrowed compared with the conventional example in which a width of two lines of bus electrodes 77 is necessary for each side because electrodes having different polarities are present on the same plane. Moreover, since there is no need to dispose electrodes having different polarities on the same plane, it is possible to allow free design.

In addition, when the same excitation frequency is used, in the conventional example, the width of the electrode finger 78 is ¼ of the wavelength of the surface acoustic wave. Whereas, in the present invention, the width of the electrode finger 8 can be only ½ of the wavelength of the surface acoustic wave. Thus, the fineness of patterning required when manufacturing the electrode can be relaxed, and the electrode fingers can be manufactured more easily compared with the conventional example. As a result, it becomes possible to manufacture the electrode at a low cost by using methods such as a liftoff method and a conductive material screen printing method.

Figure 2:
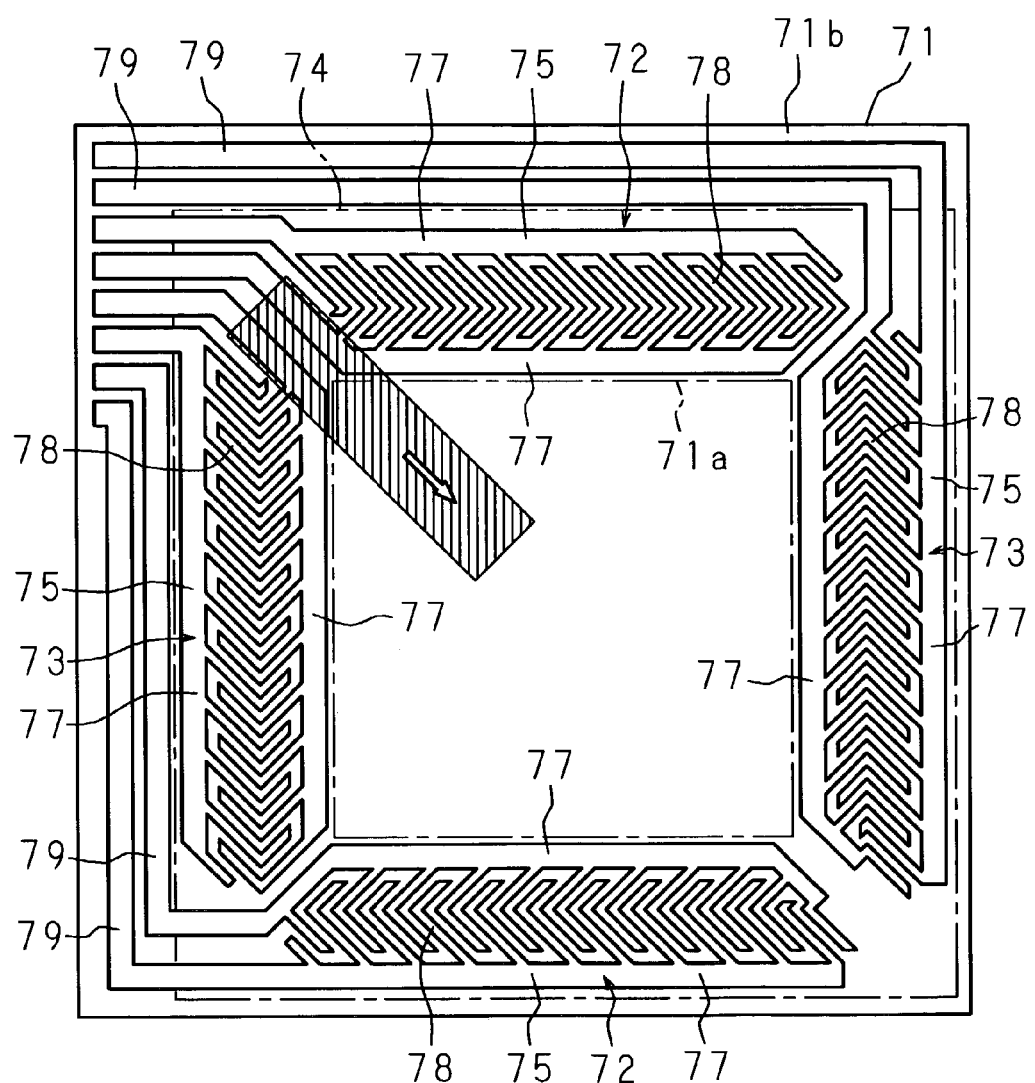
FIG. 2 is an illustration showing the configuration of a conventional touch panel device (a conventional example)
Figure 3:
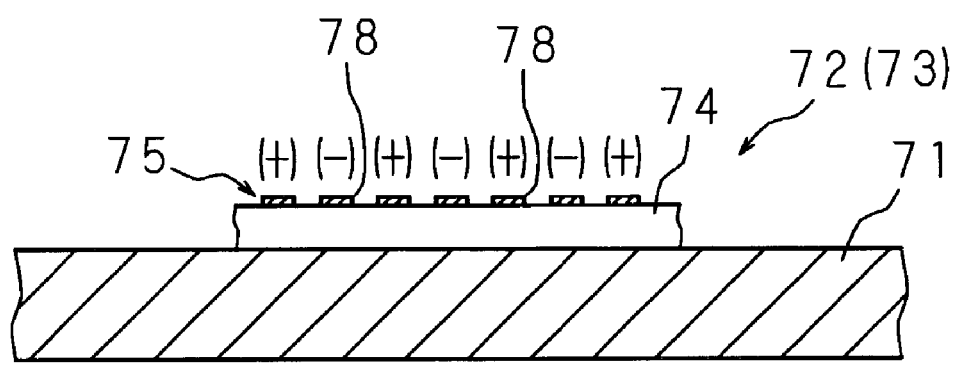
FIG. 3 is a partial cross sectional view of a conventional excitation element or receiving element.

Furthermore, in the present invention, since a width for the bus electrode is not necessary in each of the boundary areas (four corners) between a side on which the excitation element 2 is placed and a side on which the receiving element 3 is placed, a region (a section near the diagonal line shown by hatching in FIG. 4) where the surface acoustic wave propagated in the diagonal direction is weak becomes narrower compared with the conventional example (see FIG. 2), thereby enabling an improvement in the detection accuracy.

SECOND EMBODIMENT

Figure 6:
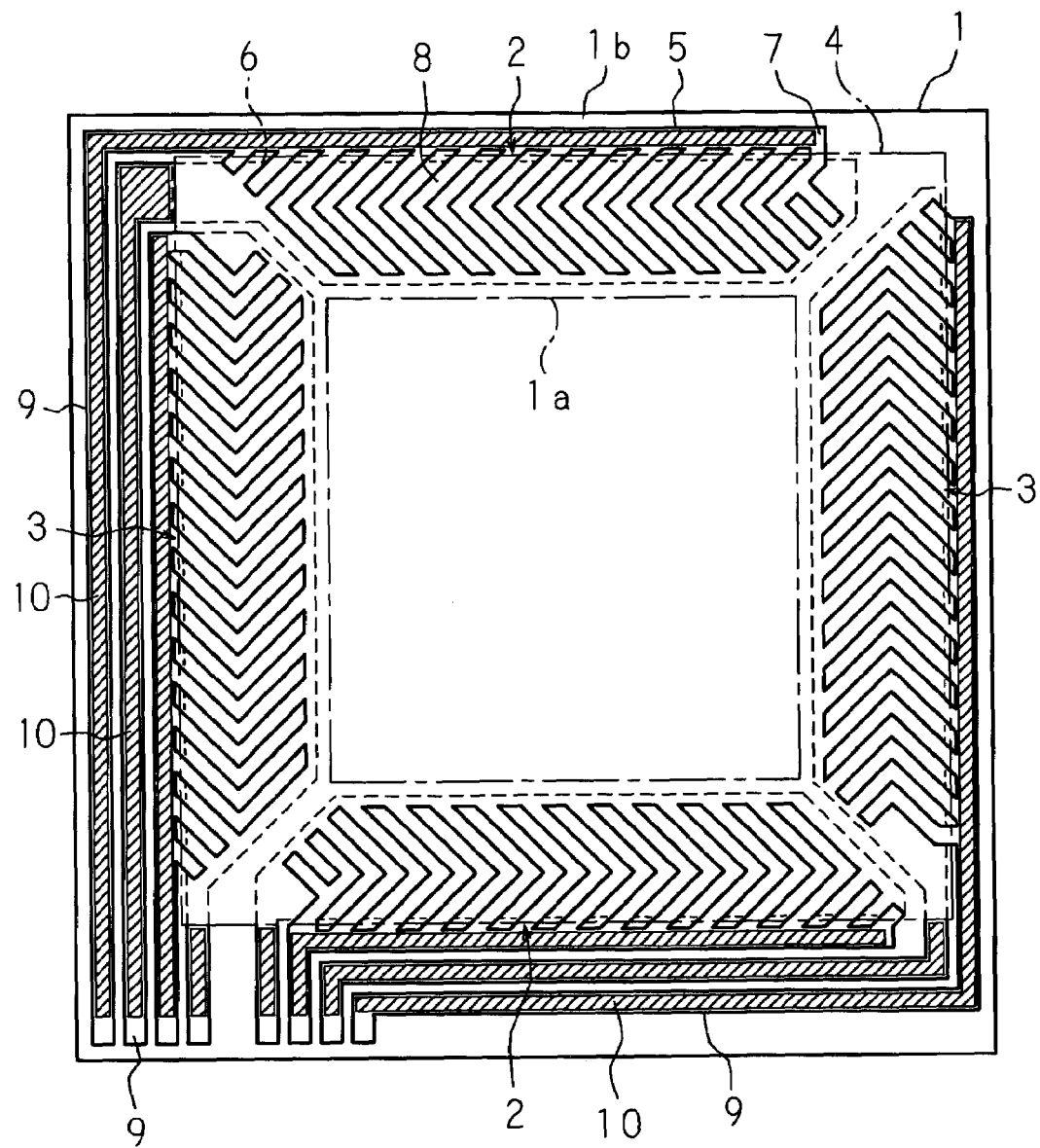
FIG. 6 is an illustration showing the configuration of a touch panel device according to the second embodiment.

FIG. 6 is an illustration showing the configuration of a touch panel device according to the second embodiment of the present invention. In FIG. 6, the parts designated with the same numerals as in FIG. 4 represent the same or similar parts.

In the second embodiment, in order to decrease the resistance at the wiring part, a conductive material 10 (a portion shown by hatching in FIG. 6) is superimposed on the drawn-round wires 9. More specifically, a silver paste is applied onto the drawn-round wires 9 produced beforehand. Alternatively, the drawn-round wires 9 may be produced directly by screen-printing the conductive material 10. Note that since other structures and operations are the same as those in the above-described first embodiment, the explanation thereof is omitted.

In the touch panel device, in order to connect each electrode of the excitation elements 2 and receiving elements 3 to an external circuit, it is necessary to draw round the drawn-round wire 9 from each comb-like electrode 5 and plate electrode 6. At this time, the resistance of the drawn-round wire 9 may affect the detection characteristics, depending on the panel size. It is thus preferred to decrease the resistance of the drawn-round wire 9. As a method for decreasing the resistance, there are a method in which the width of the drawn-round wire 9 is increased, and a method in which the thickness of the drawn-round wire 9 is increased. In the former method, when the width of the drawn-round wire 9 is increased, the width of the frame region 1b is also increased. This does collides with the narrowing of the frame region 1b. Hence, in the second embodiment, a decrease in the resistance is achieved by increasing the thickness of the drawn-round wire 9 by superimposing the conductive material 10 on the drawn-round wire 9, and thereby preventing a vicious effect on the detection characteristics due to the resistance of the drawn-round wire 9.

THIRD EMBODIMENT

Figure 7:
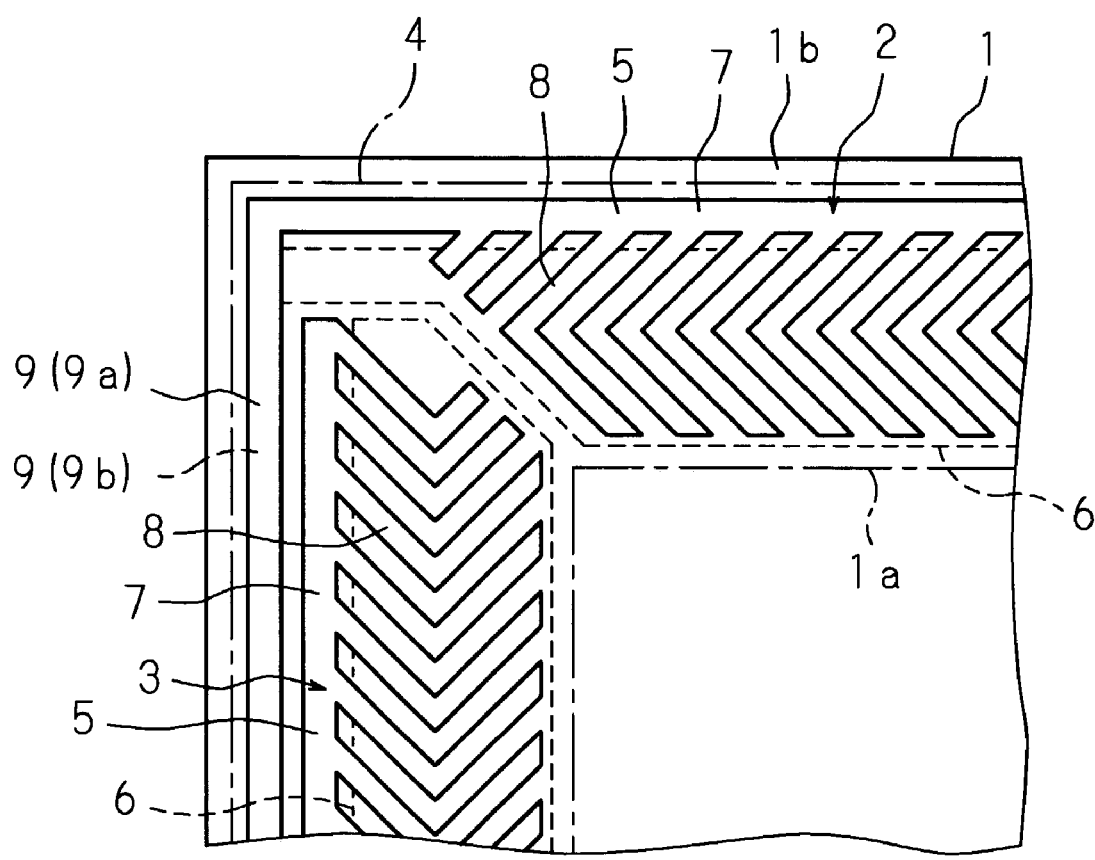
FIG. 7 is an illustration showing a part of the configuration of a touch panel device according to the third embodiment.

FIG. 7 is an illustration showing a part of the configuration of a touch panel device according to the third embodiment of the present invention. In FIG. 7, the parts designated with the same numerals as in FIG. 4 represent the same or similar parts.

In the third embodiment, not only the electrode structures, but also the drawn-round wires 9 are provided separately on both surfaces of the piezoelectric body 4. In other words, the drawn-round wire 9 from the comb-like electrode 5 and the drawn-round wire 9 from the plate electrode 6 are provided separately on the front face and rear face of the piezoelectric body 4. In the example shown in FIG. 7, the drawn-round wire 9 (9a) from the comb-like electrode 5 (bus electrode 7) of the upper-side excitation element 2 is placed on one surface (the front face) of the piezoelectric body 4, and the drawn-round wire 9 (9b) from the plate electrode 6 of the same upper-side excitation element 2 is placed on the other surface (the rear face) of the piezoelectric body 4. Note that since other structures and operations are the same as those in the above-described first embodiment, the explanation thereof is omitted.

Thus, since the drawn-round wires 9 are provided separately above and under the piezoelectric body 4, it is possible to decrease the apparent number of lines of the drawn-round wires 9 compared with a structure in which all the drawn-round wires 9 are placed on one surface of the piezoelectric body 4, thereby realizing a further narrowed frame region 1b. Moreover, the degree of freedom in the design of the drawn-round wires 9 is also improved.

FOURTH EMBODIMENT

Figure 8:
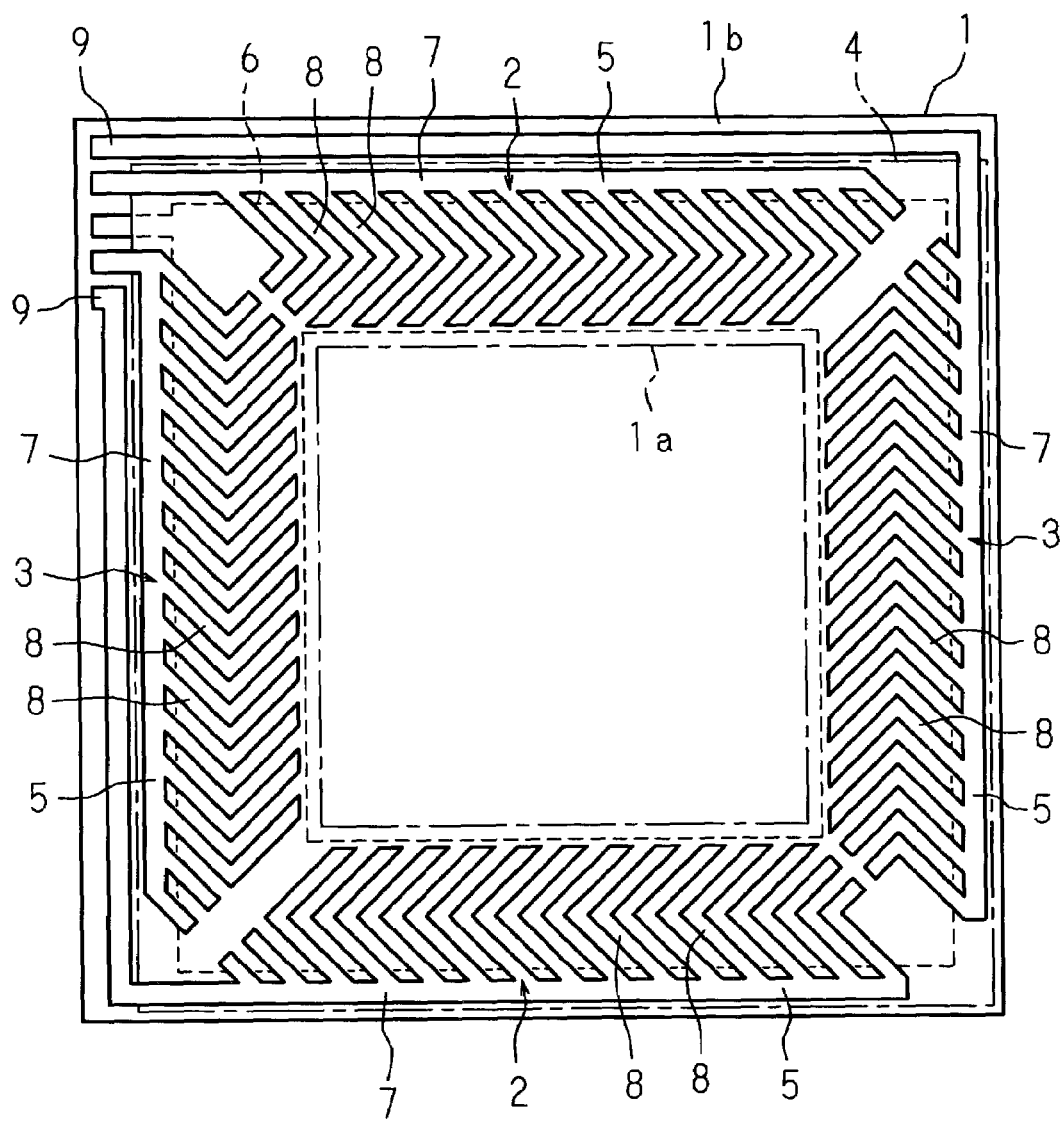
FIG. 8 is an illustration showing the configuration of a touch panel device according to the fourth embodiment.

FIG. 8 is an illustration showing the configuration of a touch panel device according to the fourth embodiment of the present invention. In FIG. 8, the parts designated with the same numerals as in FIG. 4 represent the same or similar parts.

In the fourth embodiment, a common plate electrode 6 is used for all the excitation elements 2 and receiving elements 3. In other words, the plate electrode 6 of the respective excitation elements 2 and receiving elements 3 is composed of one piece of solid electrode formed on the rear face of the piezoelectric body 4. Note that since other structures and operations are the same as those in the above-described first embodiment, the explanation thereof is omitted.

In a touch panel device capable of achieving a sufficiently large S/N ratio, it is possible to have only one drawn-round wire 9 from the plate electrode (solid electrode) 6 by adopting the above-mentioned structure of the plate electrode 6. It is therefore possible to decrease the total number of the drawn-round wires 9 and further narrow the frame region 1b. Moreover, the degree of freedom in the design of the drawn-round wires 9 from the comb-like electrodes 5 is also improved.

FIFTH EMBODIMENT

Figure 9:
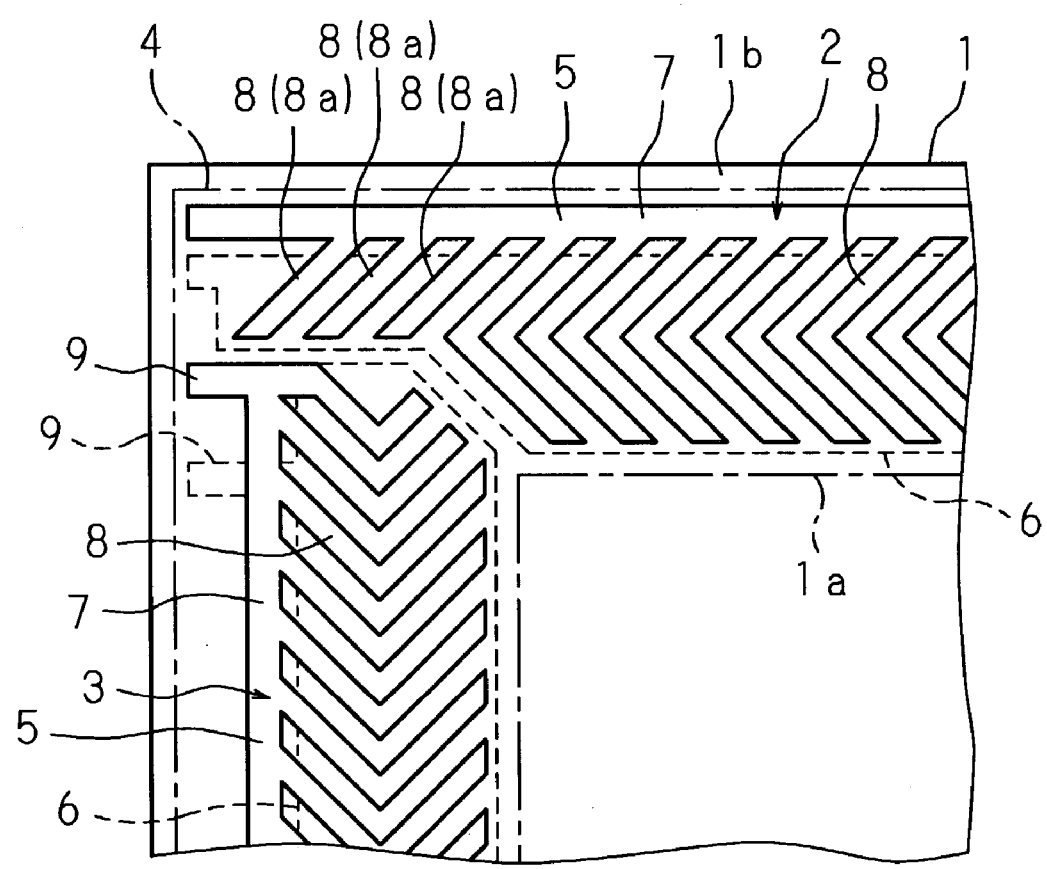
FIG. 9 is an illustration showing a part of the configuration of a touch panel device according to the fifth embodiment.

FIG. 9 is an illustration showing a part of the configuration of a touch panel device according to the fifth embodiment of the present invention. In FIG. 9, the parts designated with the same numerals as in FIG. 4 represent the same or similar parts.

In the fifth embodiment, the electrode fingers 8 of the comb-like electrode 5 of the excitation element 2 are formed beyond the boundary between adjacent sides so as to create a surface acoustic wave excitation region extending into adjacent side. More specifically, in the example shown in FIG. 9, in the upper-side excitation element 2, the electrode fingers 8 (8a) for exciting surface acoustic waves propagated in a lower right oblique direction near the diagonal line are formed so that electrode fingers 8 (8a) are extended from the bus electrode 7 to cross the boundary area to the left side. Note that since other structures and operations are the same as those in the above-described first embodiment, the explanation thereof is omitted.

In a touch panel device that propagates surface acoustic waves in a diagonal direction, the surface acoustic wave tends to be weak near the diagonal line (diagonal region). In the fifth embodiment, therefore, in each corner of the non-piezoelectric substrate 1, excessive exciting electrode fingers 8 (8a) of the excitation element 2 are formed so that the electrode fingers 8 (8a) are slightly extended into the region of adjacent receiving element 3. It is thus possible to increase the level of the surface acoustic wave near the diagonal line compared with the conventional example and the first embodiment.

Note that although the above-described embodiment explains an example in which the electrode fingers 8 of the excitation element 2 are formed over the boundary area, it is also possible to form the receiving electrode fingers 8 of the receiving element 3 beyond the boundary area so as to widen the receiving region.

SIXTH EMBODIMENT

Figure 10:
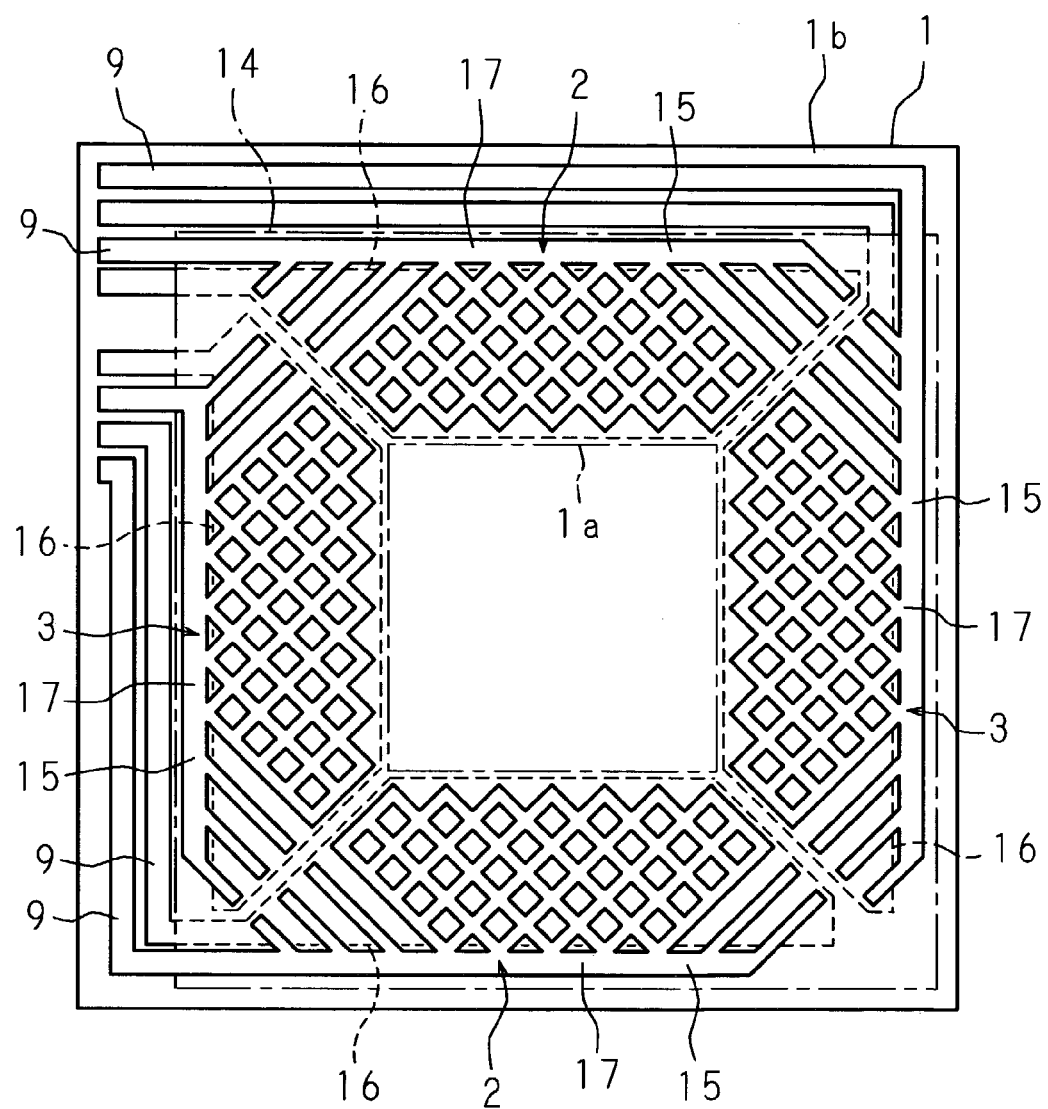
FIG. 10 is an illustration showing the configuration of a touch panel device according to the sixth embodiment.

FIG. 10 is an illustration showing the configuration of a touch panel device according to the sixth embodiment of the present invention. A non-piezoelectric substrate 1 similar to that of other embodiment comprises a detection region 1a at the center, and a frame region 1b on the periphery. Excitation elements 2 for exciting surface acoustic waves in two directions simultaneously are placed on the upper side and lower side of the frame region 1b, and receiving elements 3 for receiving surface acoustic waves from two directions simultaneously are placed on the left side and the right side of the frame region 1b.

These excitation elements 2 and receiving elements 3 have the same structure, and each of the excitation elements 2 and receiving elements 3 is constructed by forming a grid-like electrode 15 on one surface (the front face) of a piezoelectric body 14 in the form of a thin film made of AlN or ZnO, for example, and forming a plate electrode (solid electrode) 16 on the other surface (the rear face) thereof. As shown in FIG. 10, the grid-like electrode 15 on the front face comprises electrode fingers extended in two directions from a plurality of portions of a line of bus electrode 17. Drawn-round wires 9 for connecting the grid-like electrode 15 or the plate electrode 16 to external circuits (such as an oscillation circuit and received level detection circuit) are placed in the frame region 1b.

In such a structure, like the above-described first embodiment, by applying periodical signals between the grid-like electrode 15 and the plate electrode 16, the surface acoustic waves from the upper-side excitation element 2 are propagated in the lower left oblique direction and lower right oblique direction and then received by the lift-side and right-side receiving elements 3, while the surface acoustic waves from the lower-side excitation element 2 are propagated in the upper left oblique direction and upper right oblique direction and then received by the left-side and right-side receiving elements 3. It is thus possible to detect the presence or absence of contact of an object and the contact position, based on the received results at the two receiving elements 3.

In the sixth embodiment, since the grid-like electrode 15 is formed on the front face of the piezoelectric body 14 and the plate electrode 16 is formed on the rear face thereof, it is possible to produce the same effects (a narrowed frame region, free design, etc.) as in the above-described other embodiments. Moreover, the use of the grid-like electrode 15 can increase the aperture width and improve the detection accuracy as compared to the use of the comb-like electrode. Such a structure using the grid-like electrode will never be realized by the conventional example in which the electrodes are formed on only one surface of the piezoelectric body, and is thus unique to the present invention in which the electrodes are formed on both surfaces of the piezoelectric body.

Note that it is, of course, possible to apply the techniques explained in the second through fifth embodiments to the sixth embodiment using the grid-like electrode.

In the above-described embodiments, the comb-like electrode or the grid-like electrode is formed on the front face of the piezoelectric body, and the plate electrode is formed on the rear face of the piezoelectric body. On the contrary, needless to say, it is also possible to form the plate electrode on the front face of the piezoelectric body and form the comb-like electrode or the grid-like electrode on the rear face thereof.

Figure 1:
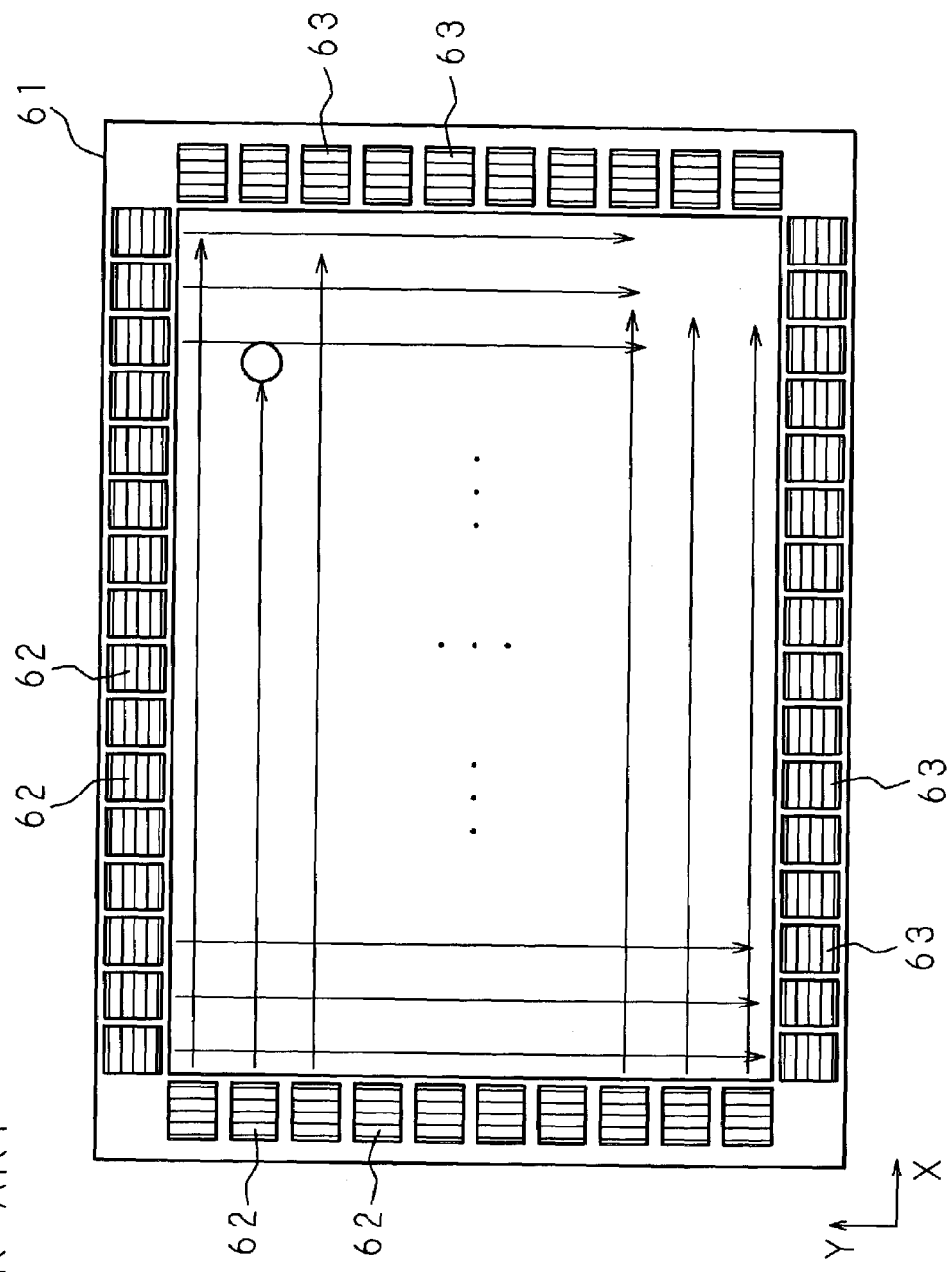
FIG. 1 is an illustration showing the configuration of a conventional touch panel device.

Besides, although the above-described embodiments explain the examples in which surface acoustic waves are propagated in a diagonal direction of the non-piezoelectric body, it is also possible to similarly apply the present invention to a touch panel device in which surface acoustic waves are propagated in a side direction of a non-piezoelectric body as shown in FIG. 1.

As described above, in the touch panel device of the present invention, since each of the excitation elements and receiving elements is constructed by forming the comb-like electrode or the grid-like electrode on one surface of the piezoelectric body and forming the plate electrode on the other surface of the piezoelectric body, it is possible to reduce the number of the bus electrodes, narrow the frame region, and improve the degree of freedom in design.

Moreover, in the touch panel device of the present invention, since an excitation element and a receiving element that forms a pair are placed on adjacent sides of the substrate so as to propagate the surface acoustic waves in the diagonal direction of the substrate, it is possible to increase the resolution performance for the detection of the contact position.

Furthermore, in the touch panel device of the present invention, the surface acoustic waves are simultaneously excited in two directions by a single excitation element and then the surface acoustic waves from two directions are simultaneously received by a single receiving element. It is thus possible to efficiently excite the surface acoustic waves and receive the surface acoustic waves.

Besides, in the touch panel device of the present invention, since a conductive material is superimposed on each drawn-round wire, it is possible to decrease the resistance of the drawn-round wire, prevent the vicious effect of the resistance on the detection process, and achieve high detection accuracy.

Additionally, in the touch panel device of the present invention, the drawn-round wire from the comb-like electrode or the grid-like electrode is placed on one surface of the piezoelectric body, and the drawn-round wire from the plate electrode is placed on the other surface of the piezoelectric body. It is therefore possible to further narrow the frame region and improve the freedom in the design of the drawn-round wires.

Moreover, in the touch panel device of the present invention, since a common plate electrode is used for the excitation elements and receiving elements, it is possible to reduce the number of the drawn-round wires and further narrow the frame region.

Besides, in the touch panel device of the present invention, since a surface acoustic wave excitation region and/or a surface acoustic receiving region is formed over a corner section (diagonal region) of the substrate and extended to an edge of adjacent side, it is possible to prevent the surface acoustic waves from becoming weaker near the diagonal line.

Furthermore, in the touch panel device of the present invention, since the grid-like electrode is used, it is possible to increase the aperture width and improve the detection accuracy compared with the structure using the comb-like electrode.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

The invention claimed is:

1. A touch panel device comprising:
a rectangular substrate; and
excitation elements for exciting surface acoustic waves and receiving elements for receiving surface acoustic waves, each of said excitation elements and said receiving elements being disposed at a peripheral section of said substrate,
wherein surface acoustic waves are propagated between said excitation elements and said receiving elements on said substrate, and a position of an object in contact with said substrate is detected based on received results at said receiving elements, and
wherein each of said excitation elements and said receiving elements comprises a film-like piezoelectric body, a comb-like electrode formed on one surface of said piezoelectric body, and a plate electrode formed on the other surface of said piezoelectric body.

2. The touch panel device of claim 1, further comprising:
a first wire connected to said comb-like electrode; and
a second wire connected to said plate electrode,
wherein said first wire is placed on the one surface of said piezoelectric body, and said second wire is placed on the other surface of said piezoelectric body.

3. The touch panel device of claim 1,
wherein said plate electrodes of said excitation elements and said plate electrodes of said receiving elements are formed as a single electrode.

4. The touch panel device of claim 1, further comprising a wire connected to said comb-like electrode or said plate electrode,
wherein a conductive material is superimposed on said wire.

5. The touch panel device of claim 4,
wherein said plate electrodes of said excitation element and said plate electrodes of said receiving element are formed as a single electrode.

6. The touch panel device of claim 1,
wherein the excitation element and receiving element that form a pair are disposed at peripheral sections in a diagonal direction of said substrate so as to propagate surface acoustic waves in the diagonal direction on said substrate.

7. The touch panel device of claim 6,
wherein said plate electrodes of said excitation elements and said plate electrodes of said receiving elements are formed as a single electrode.

8. The touch panel device of claim 6,
wherein each of said excitation elements and/or receiving elements is extended over a corner section of said substrate to an edge of adjacent side.

9. The touch panel device of claim 6, further comprising a wire connected to said comb-like electrode or said plate electrode,
wherein a conductive material is superimposed on said wire.

10. The touch panel device of claim 9,
wherein each of said excitation elements and/or receiving elements is extended over a corner section of said substrate to an edge of adjacent side.

11. The touch panel device of claim 6, further comprising:
a first wire connected to said comb-like electrode; and
a second wire connected to said plate electrode,
wherein said first wire is placed on the one surface of said piezoelectric body, and said second wire is placed on the other surface of said piezoelectric body.

12. The touch panel device of claim 11,
wherein each of said excitation elements and/or receiving elements is extended over a corner section of said substrate to an edge of adjacent side.

13. The touch panel device of claim 6,
wherein said comb-like electrode has electrode fingers bent in a middle thereof, said excitation element excites surface acoustic waves in two directions simultaneously, and said receiving element receives surface acoustic waves from two directions simultaneously.

14. The touch panel device of claim 13, further comprising a wire connected to said comb-like electrode or said plate electrode,
wherein a conductive material is superimposed on said wire.

15. The touch panel device of claim 13, further comprising:
a first wire connected to said comb-like electrode; and
a second wire connected to said plate electrode,
wherein said first wire is placed on the one surface of said piezoelectric body, and said second wire is placed on the other surface of said piezoelectric body.

16. The touch panel device of claim 13,
wherein said plate electrodes of said excitation elements and said plate electrodes of said receiving elements are formed as a single electrode.

17. The touch panel device of claim 13,
wherein each of said excitation elements and/or receiving elements is extended over a corner section of said substrate to an edge of adjacent side.

18. A touch panel device comprising:
a rectangular substrate; and
excitation elements for exciting surface acoustic waves and receiving elements for receiving surface acoustic waves, each of said excitation elements and said receiving elements being disposed at a peripheral section of said substrate, wherein surface acoustic waves are propagated between said excitation elements and said receiving elements on said substrate, and a position of an object in contact with said substrate is detected based on received results at said receiving elements, and wherein each of said excitation elements and said receiving elements comprises a film-like piezoelectric body, a grid-like electrode formed on one surface of said piezoelectric body, and a plate electrode formed on the other surface of said piezoelectric body.

19. The touch panel device of claim 18, wherein the excitation element and receiving element that form a pair are disposed at peripheral sections in a diagonal direction of said substrate so as to propagate surface acoustic waves in the diagonal direction on said substrate.

20. The touch panel device of claim 19, wherein the excitation element excites surface acoustic waves in two directions simultaneously and the receiving element receives surface acoustic waves from two directions simultaneously.

\* \* \* \* \*